(12) United States Patent
Kadir et al.

(10) Patent No.: US 8,605,965 B2
(45) Date of Patent: Dec. 10, 2013

(54) METHODS AND APPARATUS FOR GENERATING A MODIFIED INTENSITY PROJECTION IMAGE

(75) Inventors: Timor Kadir, Oxford (GB); Thomas George Wright, Oxford (GB); Nicholas Delanie Hirst Dowson, Queensland (AU)

(73) Assignee: Siemens Medical Solutions USA, Inc., Malvern, PA (US)

(*) Notice: Subject to any disclaimer, the term of this patent is extended or adjusted under 35 U.S.C. 154(b) by 757 days.

(21) Appl. No.: 12/813,754

(22) Filed: Jun. 11, 2010

(65) Prior Publication Data
US 2010/0316272 A1 Dec. 16, 2010

(30) Foreign Application Priority Data

Jun. 12, 2009 (GB) .................................. 0910138.7

(51) Int. Cl.
G06K 9/62 (2006.01)
(52) U.S. Cl.
USPC .......................................... 382/128; 382/131
(58) Field of Classification Search
None
See application file for complete search history.

(56) References Cited

U.S. PATENT DOCUMENTS

| 2005/0065421 | A1  | 3/2005  | Burckhardt |
|---|---|---|---|
| 2006/0004275 | A1  | 1/2006  | Vija et al. |
| 2006/0181551 | A1* | 8/2006  | Matsumoto ................... 345/679 |
| 2006/0235294 | A1  | 10/2006 | Florin et al. |
| 2008/0024493 | A1  | 1/2008  | Bordoloi et al. |
| 2008/0056550 | A1* | 3/2008  | Kadir et al. ................... 382/131 |
| 2008/0181475 | A1  | 7/2008  | Imasugi et al. |
| 2008/0278490 | A1  | 11/2008 | Dekel |

FOREIGN PATENT DOCUMENTS

| WO | WO 2006/099490 A1 * | 9/2006 |
|---|---|---|
| WO | WO 2009/066195 | 5/2009 |

OTHER PUBLICATIONS

Hauser et al. "Two-Level Volume Rendering," IEEE Transactions on Visualization and Computer Graphics, Vo. 7, No. 3, (2001) pp. 242-252.

* cited by examiner

Primary Examiner — John Pauls
Assistant Examiner — Jason Tiedeman
(74) Attorney, Agent, or Firm — Schiff Hardin LLP

(57) ABSTRACT

In methods and an apparatus for generating a modified intensity projection image from captured medical image data of a subject, an intensity projection image data set and a secondary image data set are obtained from the image data. A region of interest is determined in the secondary image data set, and a surface of this region of interest is then determined. The intensity projection image data set and the region of interest surface are then combined to generate the modified intensity projection image for display.

14 Claims, 5 Drawing Sheets a) b) c)

METHODS AND APPARATUS FOR GENERATING A MODIFIED INTENSITY PROJECTION IMAGE

BACKGROUND OF THE INVENTION

1. Field of the Invention

This present invention is directed to methods and apparatus for generating a modified intensity projection image from captured medical image data of a subject.

2. Description of the Prior Art

In the medical imaging field, several imaging schemes are known. For example PET (Positron Emission Tomography) is a method for imaging a subject in 3D using an injected radioactive substance which is processed in the body, typically resulting in an image indicating one or more biological functions.

In PET/CT, many important pathologies and anatomical structures appear as very high (or low) intensities. For example, a tumour in an FDG-PET image will often appear as a bright region.

A Maximum Intensity Projection (MIP) image is a useful way to visualise such medical images. Each pixel in a MIP is the maximal intensity along a ray orthogonal to the plane of the MIP. The resulting pixel values come from different depths along the rays and hence a MIP can be thought of as a simple form of 3D visualisation.

However, MIPs suffer from the following limitations:

1. A MIP provides little in the way of anatomical context and hence it is difficult to localise foci without examining the slice MPRs (multiplanar reconstructions). With FDG-PET, the physiological uptake does provide some anatomical context but is quite weak especially in areas such as the lung and mediastinum in which non-specific uptake is low.

2. An additional confusion arises from the ambiguity in orientation: it is often difficult to tell whether one is looking at the body from the anterior or the posterior.

3. The display can be difficult to interpret when multiple bright structures overlap. For example, when looking at a contrast-enhanced CT image of the thorax, the 3D nature of the thoracic structure obscures information of particular structures. In PET images, a large organ with high uptake such as the bladder, brain or heart can obscure all or most neighbouring hotspots. Similar problems can occur if two hot-spots happen to coincide for a particular viewing angle—the MIP must be rotated to separate the two hot-spots, something that can only be done with dynamic interaction of the MIP; it would not typically be useful to use such an image for a paper report.

In addition, fainter hotspots that are near to other hotter objects or even partially surrounded by them are difficult to see in the MIP. With reference to FIG. 1, one typical example of this would be a lung nodule (104) that is near to the left ventricle (102) in a PET scan. The left ventricle exhibits significant uptake and obscures a small nearby lesion (104), as shown in FIG. 1. This could also occur for lesions near the bladder, brain or a primary tumour.

FIG. 1 is a diagram of 3 frames (a, b, c) in a rotating MIP where the tumour 104 is obscured in some frames by high FDG uptake in the left ventricle, making it difficult to select MIP displays are conventionally created by deriving a sequence of 2D views, each produced by casting rays from a slightly different angle around the body. By grouping these 2D views together and displaying them in a sequence as a cine, the MIP image appears to rotate. By rotating the angle of the MIP view (either manually or automatically), it is possible to differentiate many structures that are separated in space.

For this reason, many medical imaging platforms will include the ability to change the angle of the MIP projection, and usually provide an animation of the MIP being rotated through 360 degrees.

Unfortunately, even when varying the angle of the MIP, some structures will remain occluded (e.g., if several structures lie near to each other and the axis of rotation). Also, this will not allow any visual separation of structures that are included within other structures (such as the hollow wind pipes within the trachea). It will also only allow visual separation of adjacent anatomical structures over a small range of angles, which may not be useful angles to view the anatomy.

Moreover, the MIP as created using the above process provides limited anatomical context for any regions of high activity that maybe of interest. For example, in lung cancer the location of any hotspots in the mediastinum region is important as this information may determine the prognosis and treatment options available to the patient.

In addition, to ensure that no lesions are missed a reading physician is often required to individually inspect every slice in an image to ensure that no lesions are missed, and the physician may not work off the MIP. Lesions that are missed during the slice-by-slice inspection will not be caught without a second slice-by-slice reading. Since the MIP obscures parts of the scan it cannot even be relied upon as a second check to ensure all lesions have been located.

Two previous systems, in U.S. Pat. No. 7,356,178 and U.S. Pat. No. 7,339,585, attempt to display information from relevant regions only, but this requires the regions to be selected in the first place. A system to fit an equation to the pixels lying along a projected line and displaying some representation of the equation has also been considered, in U.S. Pat. No. 7,218,765. This summarises all the information in the image, however the resulting images are unlikely to be readable without significant training and doesn't prevent multiple hotspots from being obscured. The MIP can also be used to change the values of the weights used for volume rendering, as in U.S. Pat. No. 7,250,949, but again the result shows a single 2D surface through the image which can obscure lesions. A method for displaying depth information with the MIP, as in U.S. Pat. No. 7,088,848, can indicate to the user that other lesions may exist, but a check of the individual slices is required to verify this.

The present invention aims to address these problems and provide improvements upon the known devices and methods.

Aspects and embodiments of the invention are set out in the accompanying claims.

In general terms, one embodiment of a first aspect of the invention can provide a method of generating from captured medical image data of a subject a modified intensity projection image for display, the method comprising: obtaining an intensity projection image data set from the image data; obtaining a secondary image data set from the image data, determining a region of interest in the secondary image data set; determining a surface of the region of interest; and combining the intensity projection image data set and the region of interest surface to generate the modified intensity projection image for display.

This allows an accurate combination of the information from two different image data sets, giving the clinician more context in analysing the intensity projection image.

Preferably the step of combining comprises combining the complete intensity projection image data set with only a portion of the secondary image data set, said portion delineated by the region of interest surface.

Suitably, the step of combining comprises blending the region of interest with the intensity projection image data set. This allows a simple means to combine the information from the image data sets.

More preferably, the step of combining comprises replacing part of the intensity projection image data set with the region of interest, wherein the part of the intensity projection image replaced by the region of interest is delineated by the region of interest surface. This provides a clear indication of the position of, for example, a lesion with respect to the region of interest.

Suitably, the step of combining comprises using the region of interest surface to determine a clipping point along an intensity projection ray.

In an embodiment, the step of combining comprises generating the modified intensity projection image from the intensity projection image data set using only those parts of the intensity projection image data set outside the region of interest surface.

Preferably, the secondary image data set is for a type of image different from the intensity projection image set.

Suitably, the image data comprises: the secondary image data set, captured using an anatomical imaging protocol; and the intensity projection image data set, captured using a functional imaging protocol. The anatomical imaging protocol may be, for example, a CT or MRI scan, and the functional imaging protocol may be, for example, a PET scan, such as FDG-PET.

Preferably, the method further comprises determining a registration between the intensity projection image data set and the secondary image data set.

More preferably, the surface of the region of interest is determined by a surface-rendering process.

One embodiment of a second aspect of the invention can provide a method of generating from captured medical image data of a subject a modified intensity projection image for display, the method comprising: obtaining an intensity projection image data set from the image data; obtaining a secondary image data set from the image data, determining a region of interest in the secondary image data set; and combining the intensity projection image data set and information from the region of interest to generate the modified intensity projection image for display, wherein the step of combining comprises combining the complete intensity projection image data set with only a portion of the secondary image data set, said portion contained by the region of interest.

One embodiment of a third aspect of the invention can provide a method of generating from captured medical image data of a subject a modified intensity projection image for display, the method comprising: obtaining an intensity projection image data set from the image data; obtaining a secondary image data set from the image data, determining a region of interest in the secondary image data set; and combining the intensity projection image data set and information from the region of interest to generate the modified intensity projection image for display, wherein the step of combining comprises replacing part of the intensity projection image data set with the part of the secondary image data set contained by the region of interest.

One embodiment of a fourth aspect of the invention can provide apparatus for generating from captured medical image data of a subject a modified intensity projection image for display, the apparatus comprising: a processor adapted to: obtain an intensity projection image data set from the image data; obtain a secondary image data set from the image data, determine a region of interest in the secondary image data set; determine a surface of the region of interest; and combine the intensity projection image data set and the region of interest surface to generate the modified intensity projection image for display; and a display device adapted to display the modified intensity projection image.

One embodiment of a fifth aspect of the invention can provide a method of generating, from medical image data of a subject captured by an imaging apparatus, a modified intensity projection image for display, the method comprising: obtaining, by a processor, an intensity projection image data set from the image data; obtaining, by a processor, a secondary image data set from the image data, determining, by a processor, a region of interest in the secondary image data set; determining, by a processor, a surface of the region of interest; combining, by a processor, the intensity projection image data set and the region of interest surface to generate the modified intensity projection image for display; and displaying the modified intensity projection image on a display device.

A further aspect of the invention can provide a media device storing computer program code adapted, when loaded into or run on a computer, to cause the computer to become apparatus, or to carry out a method, according to any preceding claim The above aspects and embodiments may be combined to provide further aspects and embodiments of the invention.

DESCRIPTION OF THE PREFERRED EMBODIMENTS

Figure 1:
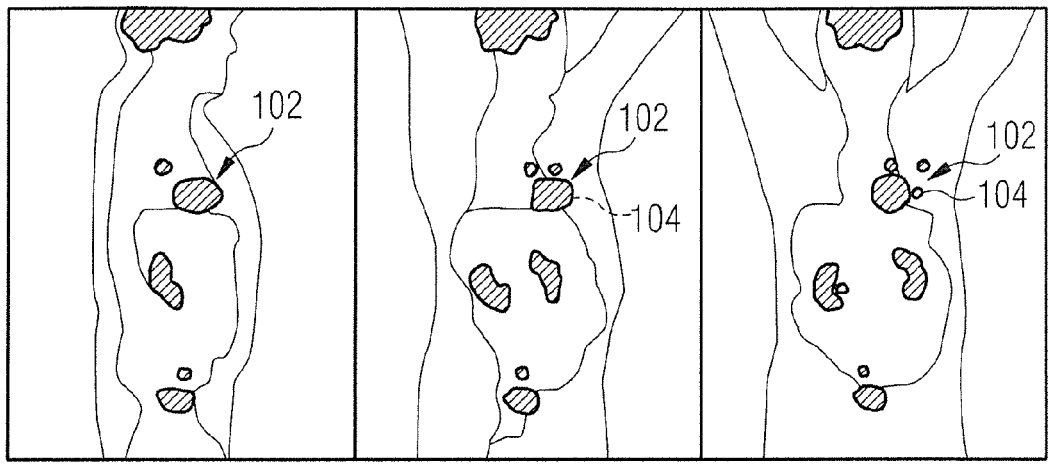
FIG. 1 is a diagram illustrating a set of maximum intensity projection images.

When the following terms are used herein, the accompanying definitions can be applied:

PET—Positron Emission Tomography

SUV—Standardised Uptake Value

FDG—F-18 fluorodeoxyglucose, a PET radiotracer

Mediastinum—a non-delineated group of structures in the thorax (chest), surrounded by loose connective tissue. It is the central compartment of the thoracic cavity. It contains the heart, the great vessels of the heart, oesophagus, trachea, thymus, and lymph nodes of the central chest MIP—Maximum Intensity Projection (or Minimum Intensity Projection, usually denoted MinIP)

MRI—Magnetic Resonance Imaging

ROI—Region of interest.

Segmentation—the process of labelling voxels as belonging to different classes. For example, in a medical image, each voxel may be labelled according to its tissue type.

Embodiments of the invention presented in this proposal can overcome limitations of previously considered methods by, for example, combining a traditional MIP of a functional modality (such as PET or SPECT) with anatomical information derived from a modality such as CT or MR. The anatomical information can be used to:

1. provide anatomical context (where in relation to the anatomy are the PET-hotspots located);
2. 'clip' MIP information to disambiguate the 'in-front/behind' situation;
3. selectively remove from the MIP display any organs with high uptake that may obscure other hotspots.

Providing anatomical objects in the MIP will help give the clinical reader a better first impression of the locations of any hotspots of interest.

One embodiment of the invention works as follows:

1. Obtain a registration between the functional and anatomical images (this may be hardware or software derived)
2. Determine at least one region of interest in the anatomical image and possibly one or more defined from the functional image
3. Produce a MIP image from the functional image which combines the information from the region of interest from the anatomical image and the anatomical image and maybe the region of interest from the functional image.

Examples of regions of interest include a segmentation of the anatomical image into say particular organs of clinical relevance and a segmentation of the hotspots in the functional image.

The resulting display can then operate in a number of ways:

(a). The display is still able to present only the MIP information; this is equivalent functionality to current systems. This is computationally relatively cheap as all views can be pre-computed. This does not however take advantage of the any information from the regions of interest.

(b). The functional MIP and a surface rendering of the regions of interest (where the exterior surface of the ROI is rendered to produce a three-dimensional visual representation of the ROI) are fused and displayed using simple alpha-blending such that each layer contributes a certain fraction of the intensity or colours to the final image; the original MIP view itself is not modified, meaning that hot-spots are not hidden when they pass behind the surfaces. This case is different from previously considered displays, such as an alpha blending of two MIP images, (a "fusion MIP"), or a blend of a VRT (Volume Rendered Technique) and a MIP. In a Fusion MIP, the data from the secondary image is controlled by a window-levelling function applied to the image data, rather than using defined regions of interest that need not be related directly to the image intensities (i.e., it may well not be possible to extract useful regions of interest just by window-levelling the MIP data). Similarly, a VRT applies a simple transfer function to the intensities from the secondary image and which does not necessarily result in the display of clinically relevant objects, unlike embodiments of the present invention, which visualise ROIs that would typically be computed for their clinical relevance, and will typically not be solely defined by image intensities of a single image.

To provide the ROIs for example from a CT scan, the CT image is segmented, then the 3D surfaces are created from the segmented regions. The blend can be any amount from zero to 100% (for the latter, everything behind the ROI will be obscured).

Figure 2:
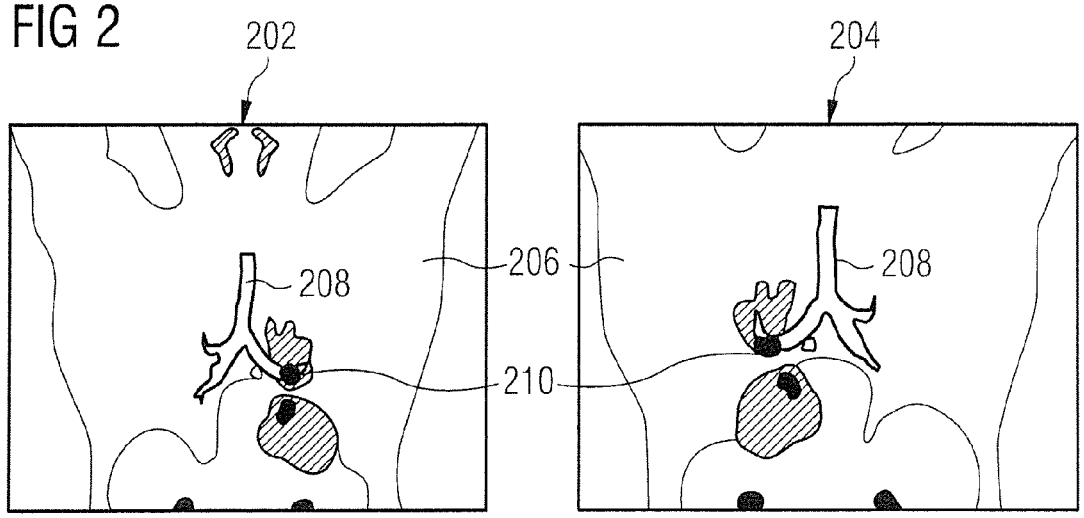
FIG. 2 is a diagram illustrating a set of modified maximum intensity projection images according to an embodiment of the invention.

FIG. 2 shows two snapshots (202, 204) of the same MIP/surface data taken at 180 degrees apart when using alpha-blending. The main image (206) is constituted by the MIP information, and the secondary image data in this case is an ROI of the airway (208) which is blended with the MIP. Note that the dark "hotspot" (210) at the base of the left bronchus is not occluded by the surface itself due to the alpha blending. This is a particularly useful application of the method, as the trachea is usually not visible in MIP images. Therefore, the combination with the surface rendered ROI of the trachea with the MIP provides information the clinician would otherwise not have available (from the same image).

Examples of this embodiment of the invention can also employ an ROI which is only a part of the secondary image. In contrast, previously considered methods have isolated or enhanced a type of tissue in an image, but have only used this entire isolated image to overlay on another image. FIG. 2 shows an example where the anatomical object of interest (the airway 208) has been surface rendered and also segmented from other parts of the secondary image. Thus the resultant images (202, 204) show only this feature blended with the MIP, rather than additional areas of the original secondary image data.

(c). The functional MIP is computed taking account of the regions of interest, i.e., the surface of the region of interest can in various ways occlude or obscure the MIP data that comes from behind them (relative to the viewer). This could be done on-the-fly or using pre-computed views. However, pre-computed views will only work for the case where the regions of interest are known at the time of pre-computation; if a user were able to interactively 'switch on/off' various organs (i.e., dynamically change the segmented organs visualised), pre-computation would be required for all possible combinations of organs in advance, something that requires considerably more computation.

(d). The functional MIP could be used in a region-of-interest (ROI) controlled way. Rather than showing the entire MIP, the user would select given ROIs, such as particular organs, or, in the case of thoracic lymph-node staging, a particular station and only the part of the MIP associated with that ROI is displayed. Other surface-rendered organs could optionally be displayed in this mode too. This would allow, for example, only the functional information from part of the body to be displayed, avoiding "pollution" from hot spots around the outside of the region selected.

In addition to the segmented anatomical object, further objects of interest maybe rendered on the MIP. For example, any VOIs that have been defined by the user from the anatomical or functional image maybe superimposed on the MIP. This image maybe used in a report to improve the communication to the referring physician and maybe used to highlight key findings.

Figure 3:
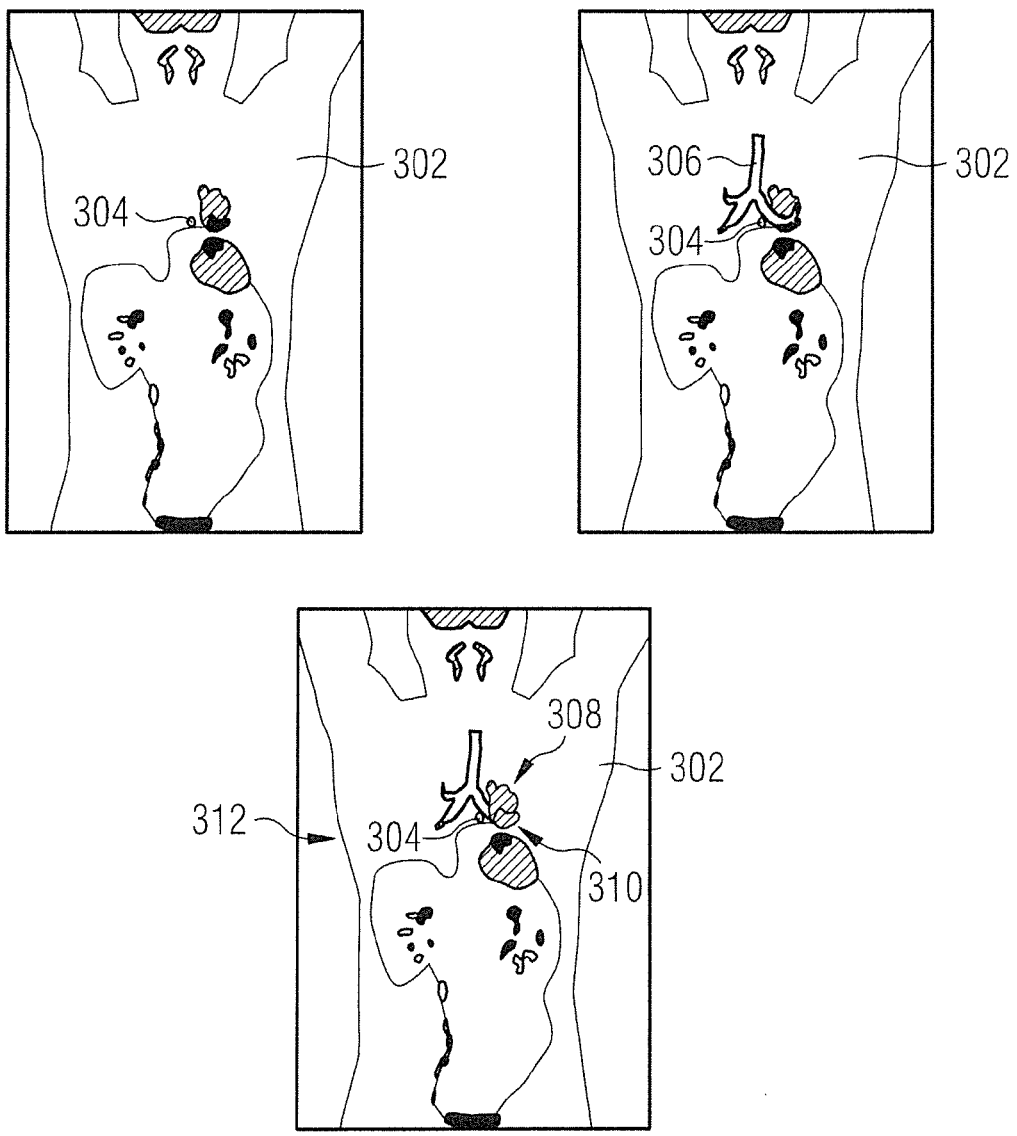
FIG. 3 is a diagram illustrating a set of modified maximum intensity projection images according to an embodiment of the invention.

A particular example of such a display is shown in FIG. 3. In this example, a PET/CT scan of a lung cancer patient is shown where the trachea (306) and aorta have been segmented automatically from the CT scan and superimposed on the PET MIP (302). In the last frame (312) of FIG. 3 VOI findings (hotspot segmentations—308, 310) have also been superimposed on the MIP. In this example the Trachea rendering enables the reader to quickly determine that the hotspot (304) is sub-carinal (i.e., below the point at which the airway branches).

There are several ways in which point (c) in the previous section (MIP computed taking ROIs into account) could be implemented. The basic case is to modify the MIP data computation such that only data from the plane of the MIP up to the surface of the region of interest would be searched for the maximal intensity; any voxels behind the region of interest relative to the viewer would be ignored at that particular angle (see FIG. 4).

Figure 4:
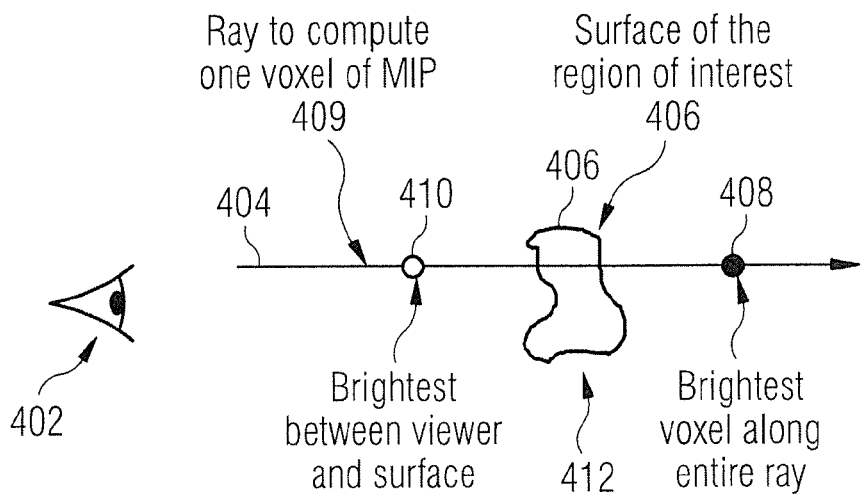
FIG. 4 is a diagram illustrating a method of modification of a MIP image according to an embodiment of the invention.

FIG. 4 is a diagram indicating how the region of interest (412) can occlude or obscure voxels. During computation of the MIP, data would only be considered between the MIP plane and the surface (406) of the region of interest. The ray illustrated (404) represents one of the set of rays for calculating the MIP, the ray for calculating one voxel of the MIP. In this case, the brightest voxel (408) along the ray cannot be seen by the viewer (402) due to the surface, and so does not appear at this projection angle; the intensity in the MIP is taken to be the intensity of the brightest voxel between the viewer and the surface of the region of interest (410).

A slightly more sophisticated approach to the embodiment described above with reference to FIG. 4, is to modify the point along the ray at which the MIP is clipped. For example, one could envisage using the centre, the back, or a neighbourhood around the organ etc. instead. It is also possible to clip between two organs through which the visual ray passes; in lymph-node analysis of the thorax, for example, it can be useful to produce a MIP of the inside the mediastinal pleural envelope only, excluding the previously mentioned segmented organs (blood and air vessels).

This clipping may be automatic and occur for all segmented structures, or it could be user-controlled. User-controlled clipping may for example be useful to remove from the display areas of high uptake in a given segmented structure. A typical example would be the heart which may have significant FDG uptake and hence obscure all or most surrounding focal areas of uptake. By removing the uptake due to the heart it is possible to visualise such focal areas.

Clipping can also provide anatomical context, since any hotspots 'disappear' behind anatomical structures used to drive the clipping as the fused display is rotated. It is hence immediately obvious whether a hotspot is behind or in front of an anatomical structure.

Figure 5:
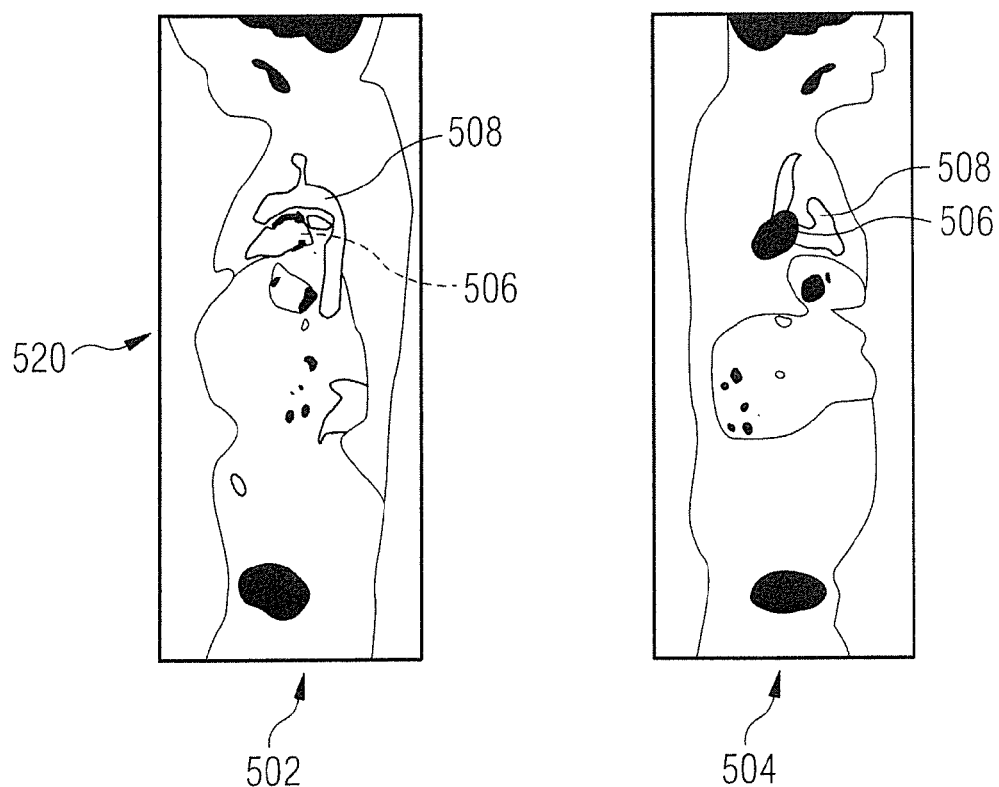
FIG. 5 is a diagram illustrating a set of modified maximum intensity projection images according to an embodiment of the invention.

FIG. 5 shows two snapshots (502, 504) of the same MIP (520) with 180 degree rotation between the two images—note how the "hotspot" (506) is occluded by the ROI surface in one of the orientations but not the other. This type of view offers a more realistic impression of relationship between the ROIs and the MIP information than simple alpha-blending (b), since it is able to unambiguously show the three-dimensional relationship between ROIs and hot-spots.

Figure 6:
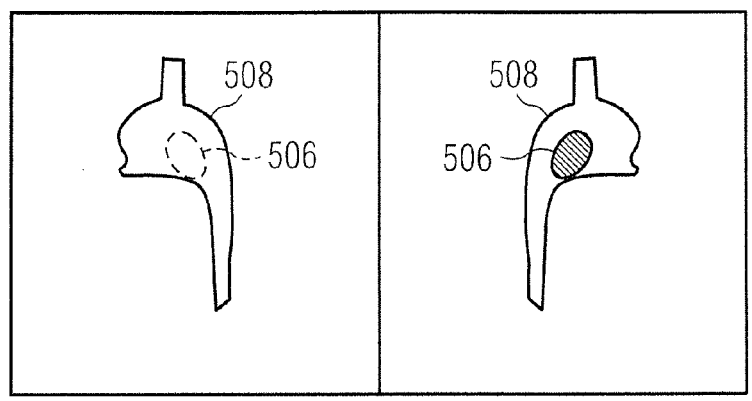
FIG. 6 is a schematic diagram of the image set of FIG. 5.

FIG. 6 is a schematic diagram of the images in FIG. 5—the hotspot 606 is obscured by the ROI surface (608) in one orientation.

There is a notable contrast with previous methods using exclusively volume-rendering to provide ROIs for overlay on images. A volume-render of an image volume traces the ray, increasing the count depending on the voxel intensity encountered. However, from this method there is no knowledge to be gained of where an object of interest actually is in the image—there is only a scale of varying intensities, and an apparent view of an object in the image if the intensity is sufficient to mark it out from its surroundings.

In contrast, in a surface-render technique (as used in an embodiment of the present invention) an object is defined in the image volume (by segmentation, and/or other definition techniques) the ray is traced, and if it hits the object, the ray is deviated. There is therefore a binary definition of whether a ray has encountered the object or not, in passing through the image volume. This allows clipping, replacement of sections of the MIP with the ROI, and other features described here.

The segmentation can be by any known technique, and could be simply drawn by a user, if required. For example, a user could define the three dimensional object using lines, each line creating a closed loop that marks the outer-boundary of the object being segmented on a particular slice, and then these loops "stacked" to create a 3D ROI.

In other embodiments, the method can include:

1. Excluding selected ROIs: Once a ROI has been indicated as a possible lesion, the MIP is recalculated with the voxels corresponding to the ROI excluded from consideration.

2. Display of risk (of being obscured): along each line of projection several intensity peaks may occur. The number of significant peaks is counted and used to assess the risk of missing a lesion. The more peaks, the higher the risk of missing something. The risk is displayed as an overlay on the MIP.

The exclusion of selected ROIs means that hotspots that were at first obscured by other hotspots are now displayed. In addition, hotspots that are not lesions can also be removed from consideration. The display of risk can indicate when to stop removing lesions or non-lesions from consideration, allowing the clinician to work exclusively on the MIP. In addition, if the clinician performs a slice-by-slice inspection of the scan, the risk display combined with the updated MIP provides a credible second check for ensuring that no lesions has been missed. The hotspot corresponding to a region on the MIP may be found using many methods e.g. local thresholding and connected component analysis, or by finding the maximum contrast region.

In contrast to previous methods, the MIP assists in obtaining the relevant ROIs, rather than using the ROIs to obtain the MIP. In addition, the resulting image is easy to interpret, and is updated, so it does not rely on the original projection being sufficient to assess whether all lesions have been found.

Figure 7:
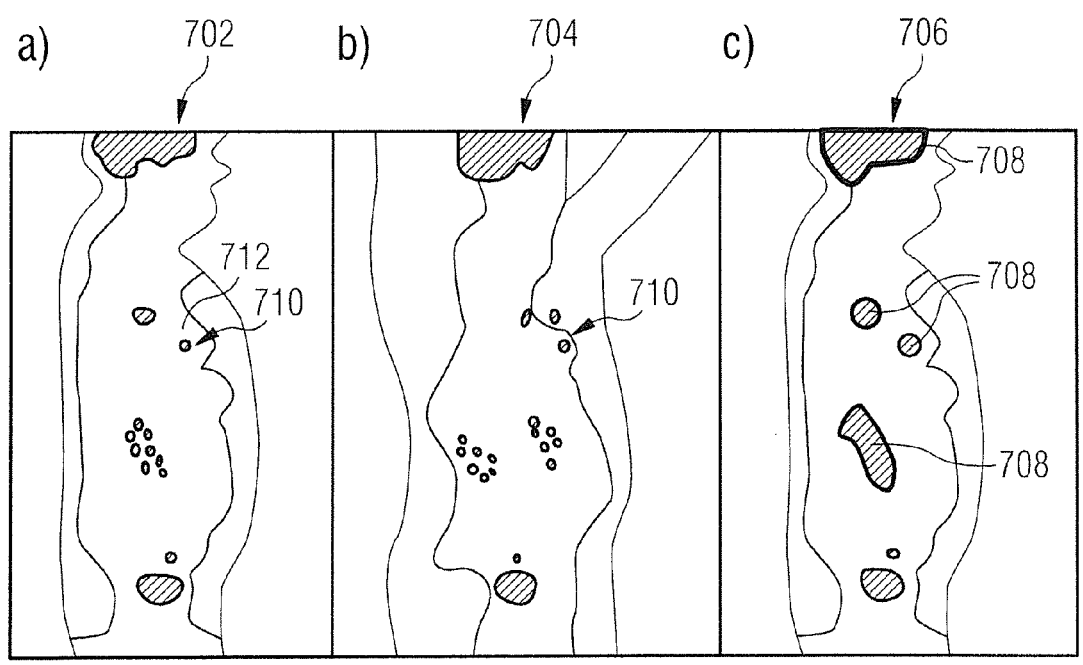
FIG. 7 is a diagram illustrating modified maximum intensity projection images according to embodiments of the invention.

An example demonstrating the operation of the proposed embodiment is shown in FIG. 7. FIG. 7 is a diagram of 2 frames (702, 704) of the rotating MIP in FIG. 1, where the left ventricle (712) has been removed from consideration, making it easier to see the lesion (710). The last frame (706) illustrates one way to present a risk map for the frame in image (a). Region outlines (708) are used; regions with thicker edges are higher risk. Non-outlined regions have no associated risk (of missing a tumour).

Certain embodiments above may rely on an explicit segmentation of the ROI, for example a surface rendering technique. A possible alternative is to use a volume-rendering approach where the CT/MR is segmented implicitly—this implicit segmentation can then used to clip the functional MIP, for example if other information delineating the precise location of the volume-rendered object is known.

The method is not limited to a functional MIP clipped by anatomical segmentation. It is also possible to clip an anatomical MIP. An example for this would be a chest CT which contains bright spots. The lungs and airways for example could be used for clipping. In this case only a single anatomical image would be used for the whole process.

As noted above for example with regard to FIG. 7, the region of interest may be derived from the functional image used for the MIP, rather than from a CT image. The region of interest may also be drawn by a user. Of course, in these cases registration may not be required.

Another alternative method can include applying additional filters to remove voxels from consideration, such as removing all voxels below a certain threshold (which adapts to which hotspots have been removed) which belong to anatomical regions such as the bones or the left ventricle, bladder and cerebellum (which typically show increased uptake in PET scans).

Figure 8:
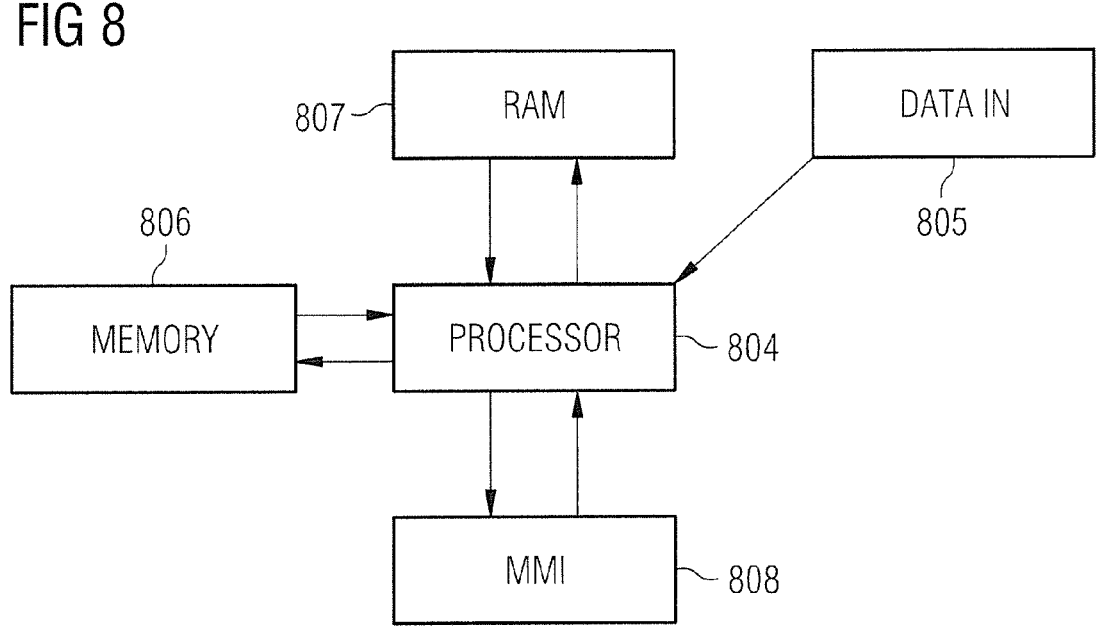
FIG. 8 is a diagram illustrating an apparatus according to an embodiment of the invention.

Referring to FIG. 8, the above embodiments of the invention may be conveniently realized as a computer system suitably programmed with instructions for carrying out the steps of the methods according to the invention.

For example, a central processing unit 804 is able to receive data representative of medical scans via a port 805 which could be a reader for portable data storage media (e.g. CD-ROM); a direct link with apparatus such as a medical scanner (not shown) or a connection to a network.

Software applications loaded on memory 806 are executed to process the image data in random access memory 807.

The processor 804 in conjunction with the software can perform the steps such as obtaining the intensity projection image data set and secondary image data set from the image data, determining the region(s) of interest and the surface(s) thereof, and combining the intensity projection image data set and the region of interest surface.

A Man—Machine interface 808 typically includes a keyboard/mouse/screen combination (which allows user input such as initiation of applications) and a screen on which the results of executing the applications are displayed.

It will be appreciated by those skilled in the art that the invention has been described by way of example only, and that a variety of alternative approaches may be adopted without departing from the scope of the invention, as defined by the appended claims.

We claim as our invention:

1. A method of generating, from captured medical image data of a subject, a modified intensity projection image for display, the method comprising:
   supplying captured image data to a computerized processor and, in said processor, obtaining an intensity projection image data set from the captured image data;
   in said processor, also obtaining a secondary image data set from the captured image data;
   in said processor, determining a region of interest in the secondary image data set;
   in said processor, determining a surface of the region of interest;
   in said processor, combining the intensity projection image data set and the region of interest surface to generate the modified intensity projection image for display, by blending the complete intensity projection image data set with only a portion of the secondary image data set, said portion delineated by the region of interest surface to produce a visual representation of the region of interest in the modified intensity projection image for display; and
   making said modified intensity projection image for display available in electronic form as a data file at an output of said processor.

2. A method according to claim 1, wherein the secondary image data set represents a type of image different from the intensity projection image set.

3. A method according to claim 2, wherein the secondary image data set is a data set captured using an anatomical imaging protocol; and the intensity projection image data set is a data set captured using a functional imaging protocol.

4. A method according to claim 1, further comprising determining a registration between the intensity projection image data set and the secondary image data set.

5. A method according to claim 1, comprising determining the surface of the region of interest by a surface-rendering process.

6. A method for generating, from captured medical image data of a subject, a modified intensity projection image for display, the method comprising:
   supplying captured image data to a computerized processor and, in said processor, obtaining an intensity projection image data set from the captured image data;
   in said processor, also obtaining a secondary image data set from the captured image data;
   in said processor, determining a region of interest in the secondary image data set;
   in said processor, determining a surface of the region of interest;
   in said processor, combining the complete intensity image projection data set with only a portion of the secondary image data set, said portion delineated by the region of interest surface, and using the region of interest surface to determine a clipping point along an intensity projection ray in said intensity projection image data set; and
   making said modified intensity projection image for display available in electronic form as a data file at an output of said processor.

7. A method according to claim 6, wherein the secondary image data set represents a type of image different from the intensity projection image set.

8. A method according to claim 7, wherein the secondary image data set is a data set captured using an anatomical imaging protocol; and the intensity projection image data set is a data set captured using a functional imaging protocol.

9. A method according to claim 6, further comprising determining a registration between the intensity projection image data set and the secondary image data set.

10. A method according to claim 6, comprising determining the surface of the region of interest by a surface-rendering process.

11. An apparatus that generates, from captured medical image data of a subject, a modified intensity projection image for display, the apparatus comprising:
    a processor supplied with captured image data, and configured to obtain an intensity projection image data set from the captured image data, obtain a secondary image data set from the captured image data, determine a region of interest in the secondary image data set, determine a surface of the region of interest, and combine the intensity projection image data set and the region of interest surface to generate the modified intensity projection image for display by blending the complete intensity projection image data set with only a portion of the secondary image data set, said portion delineated by the region of interest surface to produce a visual representation of the region of interest in the modified intensity projection image for display; and
    a display device in communication with said processor, that displays the modified intensity projection image.

12. A non-transitory, computer-readable medium encoded with programming instructions, said medium being loadable into a computerized processor and said programming instructions causing said processor to:
    obtain an intensity projection image data set from captured image data received by the processor;
    obtaining a secondary image data set from the captured image data;
    determining a region of interest in the secondary image data set;
    determining a surface of the region of interest;
    combine the intensity projection image data set and the region of interest surface to generate the modified intensity projection image for display, by blending the complete intensity projection image data set with only a portion of the secondary image data set, said portion delineated by the region of interest surface to produce a visual representation of the region of interest in the modified intensity projection image for display; and make the modified intensity projection image for display available in electronic form as a data file at an output of said processor.

13. An apparatus for generating, from captured medical image data of a subject, a modified intensity projection image for display, comprising:

a computerized processor supplied with captured image data and configured to obtain an intensity projection image data set from the captured image data;

said processor being configured to also obtain a secondary image data set from the captured image data;

said processor being configured to determine a region of interest in the secondary image data set;

said processor being configured to determine a surface of the region of interest;

said processor being configured to combine the complete intensity image projection data set with only a portion of the secondary image data set, said portion delineated by the region of interest surface, and to use the region of interest surface to determine a clipping point along an intensity projection ray in said intensity projection image data set; and a display in communication with said processor at which said modified intensity projection image is displayed.

14. A non-transitory, computer-readable medium encoded with programming instructions, said medium being loadable into a computerized processor and said programming instructions causing said processor to:

receive captured image data to a computerized processor and obtain an intensity projection image data set from the captured image data;

also obtain a secondary image data set from the captured image data;

determine a region of interest in the secondary image data set;

determine a surface of the region of interest;

in said processor, combine the complete intensity image projection data set with only a portion of the secondary image data set, said portion delineated by the region of interest surface, and use the region of interest surface to determine a clipping point along an intensity projection ray in said intensity projection image data set; and make said modified intensity projection image for display available in electronic form as a data file at an output of said processor.

* * * * *